US008553391B2

(12) United States Patent
Takeuchi et al.

(10) Patent No.: US 8,553,391 B2
(45) Date of Patent: Oct. 8, 2013

(54) ELECTRONIC COMPONENT

(75) Inventors: Syunsuke Takeuchi, Nagaokakyo (JP); Kiyoyasu Sakurada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 92 days.

(21) Appl. No.: 13/233,412

(22) Filed: Sep. 15, 2011

(65) Prior Publication Data

US 2012/0069489 A1    Mar. 22, 2012

(30) Foreign Application Priority Data

Sep. 16, 2010 (JP) .................................. 2010-208093

(51) Int. Cl.
*H01G 4/06* (2006.01)

(52) U.S. Cl.
USPC .................. 361/321.1; 361/321.2; 361/321.5; 361/311; 361/313; 361/306.1

(58) Field of Classification Search
USPC ......... 361/321.1, 321.2, 306.1, 311–313, 303
See application file for complete search history.

(56) References Cited

U.S. PATENT DOCUMENTS

| 4,038,615 | A |   | 7/1977  | Ishiyama et al. |         |
|-----------|---|---|---------|-----------------|---------|
| 5,561,587 | A | * | 10/1996 | Sanada          | 361/306.1 |
| 6,381,117 | B1| * | 4/2002  | Nakagawa et al. | 361/306.3 |
| 6,960,366 | B2|   | 11/2005 | Ritter et al.   |         |
| 6,972,942 | B2|   | 12/2005 | Ritter et al.   |         |
| 6,982,863 | B2|   | 1/2006  | Galvagni et al. |         |
| 7,067,172 | B2|   | 6/2006  | Ritter et al.   |         |
| 7,152,291 | B2|   | 12/2006 | Ritter et al.   |         |
| 7,154,374 | B2|   | 12/2006 | Ritter et al.   |         |
| 7,161,794 | B2|   | 1/2007  | Galvagni et al. |         |
| 7,177,137 | B2|   | 2/2007  | Ritter et al.   |         |
| 7,344,981 | B2|   | 3/2008  | Ritter et al.   |         |
| 7,345,868 | B2|   | 3/2008  | Trinh           |         |
| 7,463,474 | B2|   | 12/2008 | Ritter et al.   |         |
| 7,847,371 | B2| * | 12/2010 | Komatsu et al.  | 257/532 |

(Continued)

FOREIGN PATENT DOCUMENTS

EP        0 920 129 A1    6/1999
JP        64-054720 A     3/1989

(Continued)

OTHER PUBLICATIONS

Motoki et al., "Multilayer Electronic Component Including Terminal Electrodes That Each Include a Plated Layer and a Conductive Resin Layer and Method for Manufacturing the Same", U.S. Appl. No. 12/263,556, filed Nov. 3, 2008.

(Continued)

*Primary Examiner* — Nguyen T Ha
(74) *Attorney, Agent, or Firm* — Keating & Bennett, LLP

(57) ABSTRACT

In an electronic component, a laminate includes a plurality of laminated ceramic layers and a mounting surface defined by outer edges of the plurality of laminated ceramic layers, the outer edges being continuously located adjacent to each other. Capacitor conductors are disposed on the ceramic layers and include exposed portions that are exposed at the mounting surface between the ceramic layers. An electroconductive layer defining an external electrode is arranged to directly cover the exposed portions and is formed by plating so as to be made of plated material. Another electroconductive layer covers the above-mentioned electroconductive layer and partially covers surfaces of the laminate, and it is made of a material including metal and one of glass and resin.

4 Claims, 12 Drawing Sheets

(56) References Cited

U.S. PATENT DOCUMENTS

| | | |
|---|---|---|
| 2003/0151329 A1 | 8/2003 | Kadota et al. |
| 2005/0046536 A1 | 3/2005 | Ritter et al. |
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2009/0052114 A1 | 2/2009 | Motoki et al. |

FOREIGN PATENT DOCUMENTS

| | | |
|---|---|---|
| JP | 02-036608 A | 2/1990 |
| JP | 2004-095680 A | 3/2004 |
| JP | 2009-295602 A | 12/2009 |
| WO | 98/52279 A1 | 11/1998 |
| WO | 2007/049456 A1 | 5/2007 |

OTHER PUBLICATIONS

Ogawa et al., "Laminated Electronic Component and Manufacturing Method Therefor", U.S. Appl. No. 12/788,340, filed May 27, 2010.

Official Communication issued in corresponding European Patent Application No. 11175188.9, mailed on Jul. 4, 2012.

* cited by examiner

ELECTRONIC COMPONENT

BACKGROUND OF THE INVENTION

1. Field of the Invention

The present invention relates to an electronic component, and more particularly, to an electronic component including an external electrode made of a plated material and formed by plating.

2. Description of the Related Art

As a related-art electronic component, there is known a multilayer electronic component disclosed in, e.g., International Publication No. 2007/049456. The disclosed multilayer electronic component includes a laminate, internal electrodes, and external electrodes. The laminate is formed by laminating (stacking) a plurality of insulator layers. The internal electrodes define a capacitor and are exposed at an end surface of the laminate. The external electrodes are each made of an electrolytic plating deposit and are disposed to directly cover portions of the internal electrode, which are exposed from the laminate.

However, as described below, the multilayer electronic component disclosed in International Publication No. 2007/049456 has a problem in that the external electrodes are apt to peel off from the laminate. As an electronic component other than the multilayer electronic component described above, there is known, for example, an electronic component including an external electrode that is formed by coating an electroconductive paste over an end surface of a laminate. The electroconductive paste is made of metal and glass. The glass serves as an adhesive. More specifically, when the external electrode is fired, the glass is softened and then coagulated, whereby the external electrode is fixed to the laminate. Therefore, the external electrode is relatively hard to peel off from the laminate.

On the other hand, in the multilayer electronic component disclosed in International Publication No. 2007/049456, because the external electrode is formed by plating, the external electrode contains no glass. Accordingly, the external electrode of the multilayer electronic component disclosed in International Publication No. 2007/049456 is fixed to the laminate with a reduced strength as compared to the external electrode that is formed using the electroconductive paste. Therefore, in the electronic component disclosed in International Publication No. 2007/049456, the external electrode is more apt to peel off from the laminate than in the electronic component that includes the external electrode formed by using the electroconductive paste.

SUMMARY OF THE INVENTION

To overcome the problems described above, preferred embodiments of the present invention provide an electronic component, which can effectively avoid an external electrode, which is formed by plating, from being peeled off from a laminate.

According to a preferred embodiment of the present invention, an electronic component preferably includes a laminate including a plurality of laminated insulator layers and a mounting surface defined by outer edges of the plurality of laminated insulator layers, the outer edges being continuously located adjacent to each other, inner conductors disposed on the insulator layers and including exposed portions that are exposed at the mounting surface between the insulator layers, and an external electrode disposed on a surface of the laminate, the external electrode including a first electroconductive layer disposed on the mounting surface to directly cover the exposed portions and made of a plated material, and a second electroconductive layer covering at least a portion of the first electroconductive layer, covering partial surfaces of the laminate, and made of a material including metal and one of glass and resin.

With the above-described preferred embodiment of the present invention, the external electrode made of plated material and formed by plating can be effectively prevented from being peeled off from the laminate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An electronic component according to preferred embodiments of the present invention will be described below with reference to the drawings.

Figure 1:
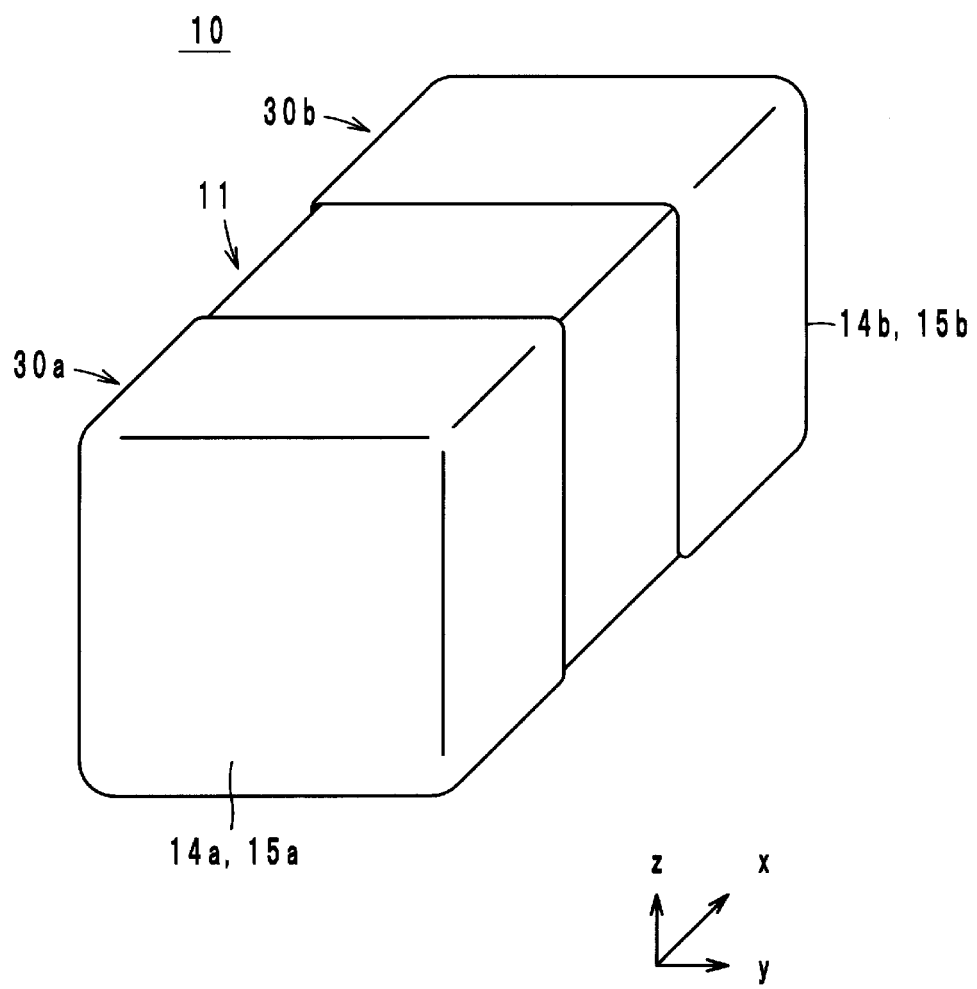
FIG. 1 is an external perspective view of an electronic component according to a preferred embodiment of the present invention.
Figure 2:
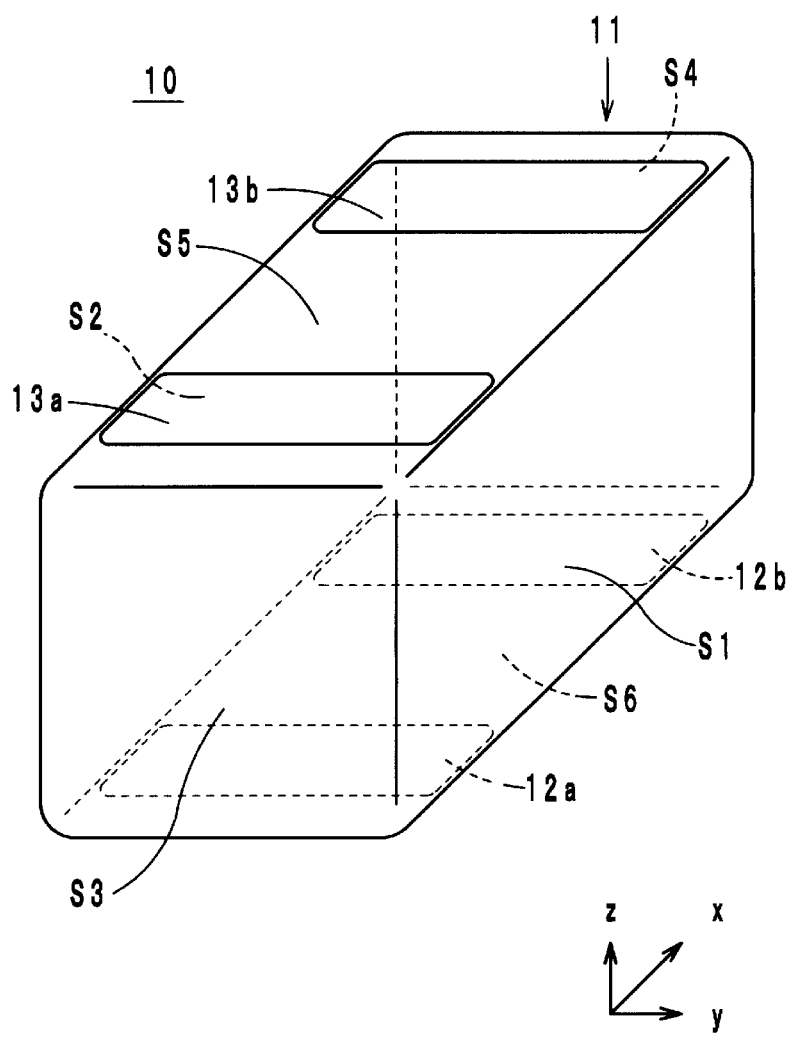
FIG. 2 is a perspective view of the electronic component shown in FIG. 1 with the omission of electroconductive layers of the electronic component.
Figure 3:
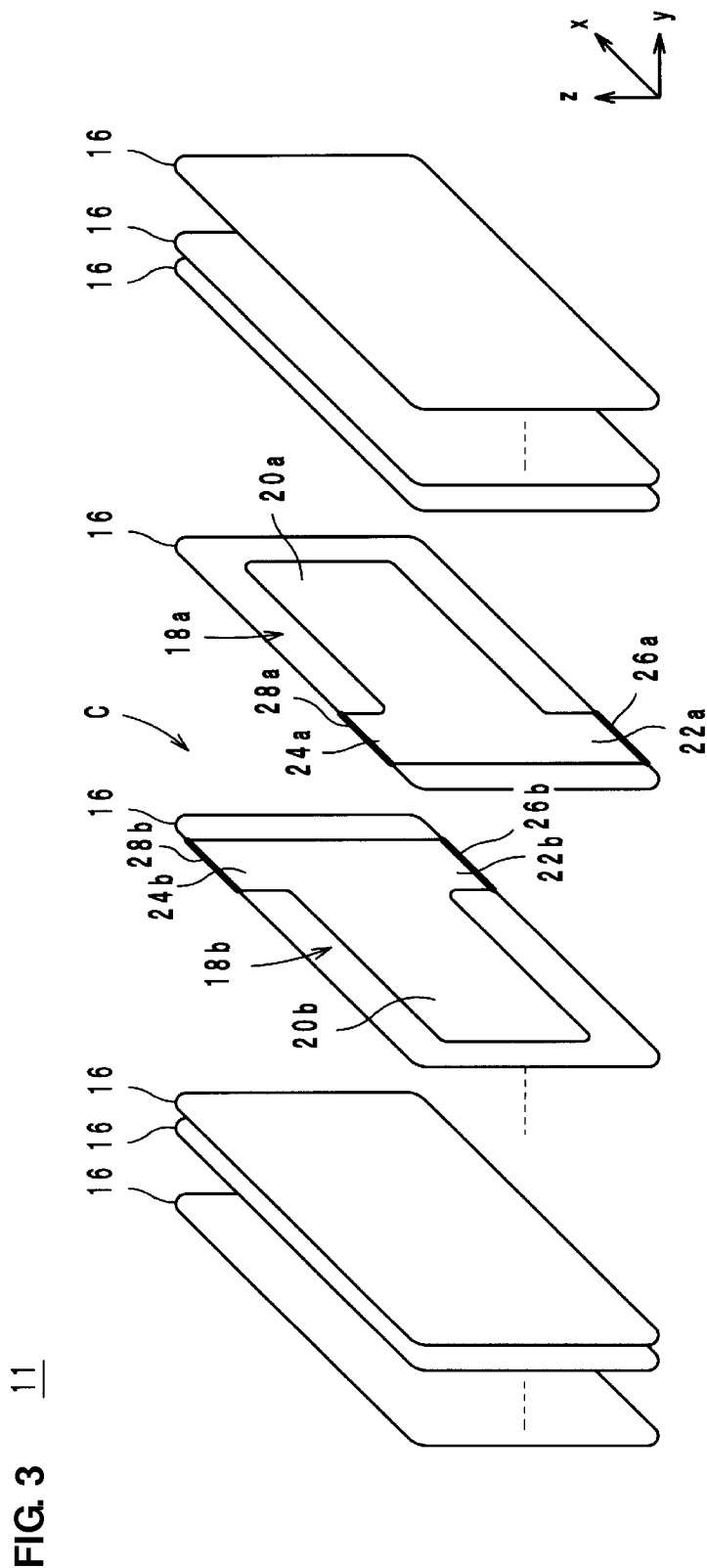
FIG. 3 is an exploded perspective view of a laminate in the electronic component shown in FIG. 1.
Figure 4:
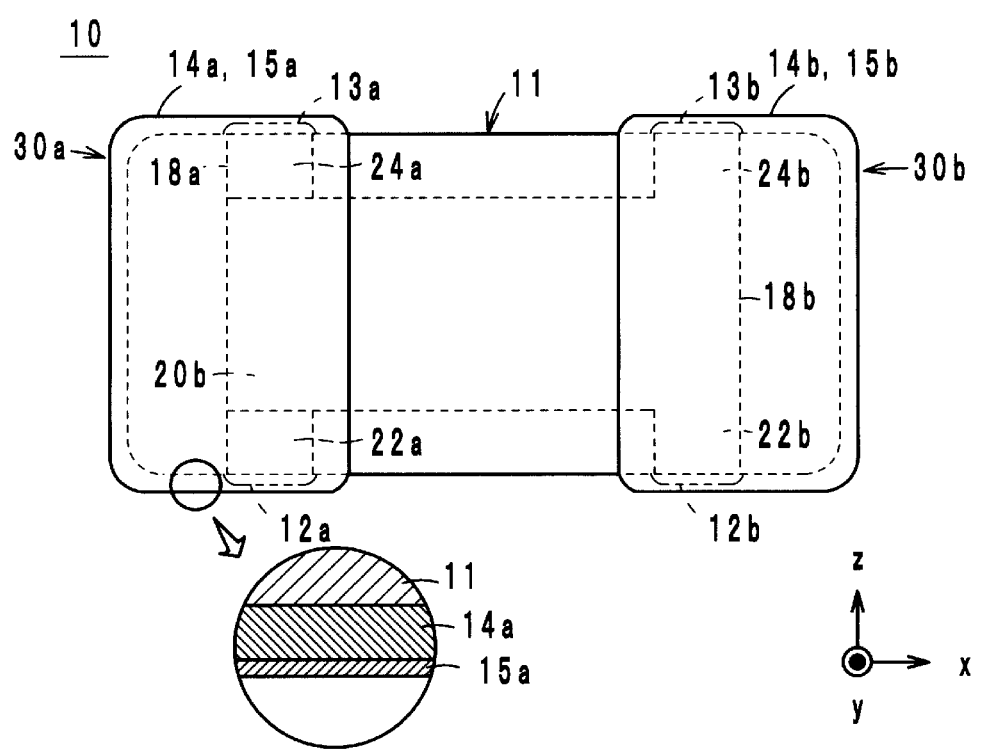
FIG. 4 is a plan view illustrating the electronic component shown in FIG. 1 while seeing through the electronic component from above in a laminating direction.

The construction of the electronic component is described with reference to the drawings. FIG. 1 is an external perspective view of an electronic component 10 according to a preferred embodiment of the present invention. FIG. 2 is a perspective view of the electronic component 10 with the omission of electroconductive layers 14a and 14b defining portions of external electrodes 30a and 30b of the electronic component 10. FIG. 3 is an exploded perspective view of a laminate 11 in the electronic component 10. FIG. 4 is a plan view illustrating the electronic component 10 while seeing through the electronic component 10 from above in a laminating direction. FIG. 4 further illustrates a cross-sectional structure of the electronic component 10 in an enlarged view. In the following description, the laminating direction of the laminate 11 is defined as a y-axis direction. The lengthwise direction of the laminate 11 when viewing the laminate 11 in the y-axis direction is defined as an x-axis direction. The widthwise direction of the laminate 11 when viewing the laminate 11 in the y-axis direction is defined as a z-axis direction.

The electronic component 10 is a preferably chip capacitor. As illustrated in FIGS. 1 to 3, the electronic component 10 includes the laminate 11, external electrodes 30 (30a, 30b), and a capacitor C (see FIG. 3).

The laminate 11 preferably has a substantially rectangular parallelepiped shape, for example. As illustrated in FIG. 2, the laminate 11 includes side surfaces S1 and S2, end surfaces S3 and S4, an upper surface S5, and a lower surface S6. Corners and ridges of the laminate 11 are preferably rounded by chamfering, for example. In the following description, as illustrated in FIG. 2, a surface of the laminate 11 facing the positive direction side in the y-axis direction is denoted as the side surface S1, and a surface thereof facing the negative direction side in the y-axis direction is denoted as the side surface S2. Also, a surface of the laminate 11 facing the negative direction side in the x-axis direction is denoted as the end surface S3, and a surface thereof facing the positive direction side in the x-axis direction is denoted as the end surface S4. Further, a surface of the laminate 11 facing the positive direction side in the z-axis direction is denoted as the upper surface S5, and a surface thereof facing the negative direction side in the z-axis direction is denoted as the lower surface S6. The lower surface S6 defines a mounting surface that is arranged to face a circuit board when the electronic component 10 is mounted to the circuit board.

As illustrated in FIG. 3, the laminate 11 includes a plurality of laminated ceramic layers (insulator layers) 16. The ceramic layers 16 are each preferably substantially rectangular and made of a dielectric ceramic, for example. Examples of the dielectric ceramic are $BaTiO_3$, $CaTiO_3$, $SrTiO_3$, and $CaZrO_3$. The dielectric ceramic may preferably include at least one of those materials as a main component and a Mn compound, a Fe compound, a Cr compound, a Co compound, or a Ni compound, for example, as an accessory component. The thickness of the ceramic layer 16 is preferably in a range from about 0.5 μm to about 10 μm, for example. In the following description, a principal surface of the ceramic layer 16 on the positive direction side in the y-axis direction is denoted as a front surface, and a principal surface of the ceramic layer 16 on the negative direction side in the y-axis direction is denoted as a rear surface.

Thus, the side surface S1 of the laminate 11 defines the front surface of the ceramic layer 16, which is located farthest on the positive direction side in the y-axis direction. The side surface S2 of the laminate 11 is defined the rear surface of the ceramic layer 16, which is located farthest on the negative direction side in the y-axis direction. Also, the end surface S3 is defined by shorter sides (outer edges) of the plurality ceramic layers 16, which are continuously arranged adjacent to each other on the negative direction side in the x-axis direction. The end surface S4 is defined by shorter sides (outer edges) of the plurality ceramic layers 16, which are continuously arranged adjacent to each other on the positive direction side in the x-axis direction. The upper surface S5 is defined by longer sides (outer edges) of the plurality of ceramic layers 16, which are continuously arranged adjacent to each other on the positive direction side in the z-axis direction. The lower surface S6 is defined by longer sides (outer edges) of the plural ceramic layers 16, which are continuously arranged adjacent to each other on the negative direction side in the z-axis direction.

As illustrated in FIG. 3, the capacitor C includes capacitor conductors (inner conductors) 18a, 18b that are included in the laminate 11. Preferably, each of the capacitor conductors 18 is made of an electroconductive material, e.g., Ni, Cu, Ag, Pd, an Ag—Pd alloy, or Au, and has a thickness in a range of about 0.3 μm to about 2.0 μm, for example.

The capacitor conductor 18a is disposed on a surface of the ceramic layer 16 and includes a capacitor portion 20a and lead portions 22a and 24a. The capacitor portion 20a is preferably substantially rectangular and is disposed inward of outer edges of the ceramic layer 16 without extending to the outer edges. The lead portion 22a extends toward the negative direction side in the z-axis direction from a region of a longer side of the capacitor portion 20a on the negative direction side in the z-axis direction, which region is located near an end of the longer side thereof on the negative direction side in the x-axis direction. Thus, the lead portion 22a extends to the longer side of the ceramic layer 16 on the negative direction side in the z-axis direction. The lead portion 22a includes, at its distal end on the negative direction side in the z-axis direction, an exposed portion 26a that is exposed between two adjacent ceramic layers 16 at the lower surface S6 of the laminate 11. The lead portion 24a extends toward the positive direction side in the z-axis direction from a region of a longer side of the capacitor portion 20a on the positive direction side in the z-axis direction, which region is located near an end of the longer side thereof on the negative direction side in the x-axis direction. Thus, the lead portion 24a extends to the longer side of the ceramic layer 16 on the positive direction side in the z-axis direction. The lead portion 24a includes, at its distal end on the positive direction side in the z-axis direction, an exposed portion 28a that is exposed between two adjacent ceramic layers 16 at the upper surface S5 of the laminate 11.

The capacitor conductor 18b is disposed on a surface of another ceramic layer 16 and includes a capacitor portion 20b and lead portions 22b and 24b. The capacitor portion 20b is substantially rectangular and is arranged inward of outer edges of the ceramic layer 16 without extending to the outer edges. Further, the capacitor portion 20b is opposed to the capacitor portion 20a with the ceramic layer 16 disposed therebetween. With such an arrangement, an electrostatic capacity is generated between the capacitor portions 20a and 20b. The lead portion 22b extends toward the negative direction side in the z-axis direction from a region of a longer side of the capacitor portion 20b on the negative direction side in the z-axis direction, which region is positioned near an end of the longer side thereof on the positive direction side in the x-axis direction. Thus, the lead portion 22b extends to the longer side of the ceramic layer 16 on the negative direction side in the z-axis direction. The lead portion 22b is located farther away on the positive direction side in the x-axis direction than the lead portion 22a. The lead portion 22b includes, at its distal end on the negative direction side in the z-axis direction, an exposed portion 26b that is exposed between two adjacent ceramic layers 16 at the lower surface S6 of the laminate 11. The lead portion 24b extends toward the positive direction side in the z-axis direction from a region of a longer side of the capacitor portion 20b on the positive direction side in the z-axis direction, which region is located near an end of the longer side thereof on the positive direction side in the x-axis direction. Thus, the lead portion 24b extends to the longer side of the ceramic layer 16 on the positive direction side in the z-axis direction. The lead portion 24b is located farther away on the positive direction side in the x-axis direction than the lead portion 24a. The lead portion 24b includes, at its distal end on the positive direction side in the z-axis direction, an exposed portion 28b that is exposed between two adjacent ceramic layers 16 at the upper surface S5 of the laminate 11.

The above-described capacitor conductors 18a and 18b are provided on the plurality of ceramic layers 16 such that they are alternately arranged in the y-axis direction. With such an arrangement, the capacitor C is defined in an area at which the capacitor conductor 18a and the capacitor conductor 18b are opposed to each other with the ceramic layer 16 interposed therebetween.

The external electrodes 30a, 30b preferably include electroconductive layers (first electroconductive layers) 12a, 12b (see FIG. 2), electroconductive layers (first electroconductive layers) 13a, 13b (see FIG. 2), electroconductive layers (second electroconductive layers) 14a, 14b, and electroconductive layers 15a, 15b.

The electroconductive layers 12a and 12b are disposed on the lower surface S6 to directly cover the exposed portions 26a and 26b, respectively, and are formed by plating and thus made of plated material. The electroconductive layer 12a is located farther away on the negative direction side in the x-axis direction than the electroconductive layer 12b. The electroconductive layers 12a and 12b are each substantially rectangular and are arranged so as not to extend off of the lower surface S6. The electroconductive layers 13a and 13b are disposed on the upper surface S5 to directly cover the exposed portions 28a and 28b, respectively, and are formed by plating and thus made of plated material. The electroconductive layer 13a is located farther away on the negative direction side in the x-axis direction than the electroconductive layer 13b. The electroconductive layers 13a and 13b are each substantially rectangular and are arranged so as not to extend off the upper surface S5. Preferably, each of the electroconductive layers 12 and 13 is made of, for example, at least one kind of metal selected from a group consisting of Cu, Ni, Sn, Pb, Au, Ag, Pd, Bi and Zn, or an alloy including at least one of those metals, and has a thickness in a range of about 1 μm to about 15 μm, for example.

Preferably, the electroconductive layers 12a, 12b, 13a and 13b do not include glass.

Preferably, a metal proportion per unit volume in each of the electroconductive layers 12a, 12b, 13a and 13b is about 99% or more by weight, for example.

The electroconductive layer 14a covers not only at least respective portions of the electroconductive layers 12a and 13a, but also portions of the surfaces of the laminate 11 as illustrated in FIGS. 1 and 4, and it is made of a material (sintered metal) including metal and glass. In the electronic component 10 according to this preferred embodiment, the electroconductive layer 14a entirely covers the electroconductive layers 12a and 13a. More specifically, the electroconductive layer 14a is arranged such that it covers substantially the entire end surface S3 of the laminate 11 and it is folded at edges of the end surface S3 so as to extend over respective portions of the side surfaces S1 and S2, the upper surface S5, and the lower surface S6, which are adjacent to the end surface S3. In other words, the electroconductive layer 14a is arranged to spread in continuously overlapping relation over the lower surface S6 defining the mounting surface and the surfaces (i.e., the side surfaces S1, S2 and the end surface S3) of the laminate 11, which are adjacent to the lower surface S6.

The electroconductive layer 14b covers not only at least respective portions of the electroconductive layers 12b and 13b, but also portions of the surfaces of the laminate 11 as illustrated in FIGS. 1 and 4, and it is preferably made of a material (sintered metal) including metal and glass, for example. In the electronic component 10 according to this preferred embodiment, the electroconductive layer 14b substantially entirely covers the electroconductive layers 12b and 13b. More specifically, the electroconductive layer 14b is arranged such that it covers substantially the entire end surface S4 of the laminate 11 and it is folded at edges of the end surface S4 to extend over respective portions of the side surfaces S1 and S2, the upper surface S5, and the lower surface S6, which are adjacent to the end surface S4. In other words, the electroconductive layer 14b is arranged to spread in continuously overlapping relation over the lower surface S6 defining the mounting surface and the surfaces (i.e., the side surfaces S1, S2 and the end surface S4) of the laminate 11, which are adjacent to the lower surface S6.

The metal component included in each of the electroconductive layers 14a and 14b is preferably, for example, one kind of metal selected from a group consisting of Cu, Ni, Ag and Pd, or an alloy including one of those metals. The glass component contained therein is preferably, for example, glass containing B, Si, Ba, Mg, Al, Li, etc. Preferably, each of the electroconductive layers 14a and 14b has a thickness of in a range of about 3 μm to about 10 μm, for example.

As illustrated in FIG. 1 and the enlarged view in FIG. 4, the electroconductive layers 15a and 15b are preferably arranged to directly cover the electroconductive layers 14a and 14b, respectively, and are formed by plating and are thus made of plated material. Each electroconductive layer 15 may include a plurality of electroconductive layers. Preferably, each electroconductive layer 15 is made of, e.g., one kind of metal selected from a group consisting of Cu, Ni, Sn, Pb, Au, Ag, Pd, Bi and Zn, or an alloy including one of those metals, and has a thickness in a range of about 1 μm to about 15 μm, for example.

The electronic component 10 having the above-described construction is used in a state mounted to a circuit board. At that time, the electronic component 10 is mounted to the circuit board such that the lower surface S6 is arranged to face the circuit board.

A method of manufacturing the electronic component 10 will be described below with reference to FIGS. 1 to 4.

First, predetermined materials are weighed and loaded into a ball mill in which those materials are wet-mixed. The resulting mixture is dried and pulverized. The obtained powder is calcined. The calcined powder is wet-pulverized in a ball mill and dried. The dried powder is disintegrated, whereby dielectric ceramic powder is obtained.

An organic binder and an organic solvent are added to the dielectric ceramic powder, and they are mixed with one another by using a ball mill. The obtained ceramic slurry is coated in the form of a sheet on a carrier sheet by the doctor blade process and is then dried, thus forming a ceramic green sheet that is to become the ceramic layer 16.

Next, a paste made of an electroconductive material is coated on the ceramic green sheet, which is to become the ceramic layer 16, by screen printing or photolithography, for example, whereby the capacitor conductors 18a and 18b are formed. The paste made of the electroconductive material is prepared, for example, by adding an organic binder and an organic solvent to metal powder.

Next, the ceramic green sheets, each of which is to become the ceramic layer 16, are laminated to obtain a mother laminate in a state not yet fired. Thereafter, the mother laminate in the state not yet fired is compressed using a hydraulic pressure press, for example.

Next, the mother laminate in the state not yet fired is cut into a predetermined size to obtain a plurality of laminates 11 that are not yet fired. The not-yet-fired laminates 11 are then fired. The firing temperature is preferably, for example, in a range of about 900° C. to about 1300° C. Through the above-described steps, the fired laminates 11 including the capacitor conductors 18 are produced.

Next, the surface of the laminate 11 is subjected to polishing, such as barrel polishing, for example. With the barrel polishing, the exposed portions 26a, 26b, 28a and 28b are each exposed at the upper surface S5 or the lower surface S6 in an increased area than before the barrel polishing.

Next, the electroconductive layers 12 and 13 are formed by plating. More specifically, the laminate 11 is disposed in a pored barrel in which electroconductive media are loaded. The barrel is then immersed in a plating solution and rotated for a predetermined time. With the rotation of the barrel, the electroconductive media contact the exposed portions 26a, 26b, 28a and 28b and supply electric power to them. As a result, metals are deposited on the exposed portions 26a, 26b, 28a and 28b, and the electroconductive layers 12 and 13 are formed.

Next, the electroconductive layers 14 are formed by the dipping process. More specifically, the laminate 11 is dipped in an electroconductive paste including metal and glass. The coated electroconductive paste is then fired preferably at a temperature in a range of about 700° to about 900°, for example, thereby forming the electroconductive layers 14.

Next, the electroconductive layers 15 are formed by plating. More specifically, the laminate 11 is disposed in a pored barrel in which electroconductive media are loaded. The barrel is then immersed in a plating solution and rotated for a predetermined time. With the rotation of the barrel, the electroconductive media contact the electroconductive layers 14 and supply electric power to them. As a result, metals are deposited on the electroconductive layers 14, and the electroconductive layers 15 are formed. Through the above-described steps, the electronic component 10 is produced.

With the electronic component 10 described above, the electroconductive layers 12 and 13 formed by plating can be effectively prevented from being peeled off from the laminate 11. To describe this in more detail, in the multilayer electronic component disclosed in the above-cited International Publication No. 2007/049456, because the external electrodes are formed by plating, they do not include glass. Therefore, the external electrodes of the multilayer electronic component disclosed in the above-cited International Publication No. 2007/049456 are fixed to the laminate with relatively low strength. Thus, the external electrodes are likely to peel off from the laminate in the multilayer electronic component disclosed in the above-cited International Publication No. 2007/049456.

On the other hand, in the electronic component 10, the electroconductive layers 14 are each preferably made of the material including metal and glass. Therefore, the electroconductive layers 14 are fixed to the laminate 11 with a relatively high strength due to the adhesive effect of the glass. Further, the electroconductive layers 14 are arranged to directly cover at least respective portions of the electroconductive layers 12 and 13 that are formed by plating. Accordingly, the electroconductive layers 14 function to prevent the electroconductive layers 12 and 13 from being peeled off from the laminate 11. As a result, with the electronic component 10, the electroconductive layers 12 and 13 can be effectively prevented from being peeled off from the laminate 11.

Further, in the electronic component 10 according to this preferred embodiment, the electroconductive layers 14 substantially entirely cover the electroconductive layers 12 and 13. With the electronic component 10, therefore, the electroconductive layers 12 and 13 can be more effectively prevented from being peeled off from the laminate 11.

Still further, in the electronic component 10, the electroconductive layers 14 are each arranged to extend in continuously overlapping relation over the surfaces of the laminate 11, which are adjacent to the lower surface S6 defining the mounting surface. Thus, since the electroconductive layers 14 are each arranged to extend in continuously overlapping relation over the plurality of surfaces, electroconductive layers 14 are connected to the laminate 11 with increased strength. As a result, with the electronic component 10, the electroconductive layers 12 and 13 can be even more effectively prevented from being peeled off from the laminate 11.

In addition, an element size can be reduced with the electronic component 10. That point will be described below by comparing an electronic component (called an "ordinary electronic component") including external electrodes, which are formed by coating an electroconductive paste on end surfaces of a laminate, and the electronic component 10 with each other.

In the ordinary electronic component, the external electrodes are formed by immersing the laminate in the electroconductive paste. In that case, the external electrodes are in contact with internal electrodes exposed from the laminate, to thereby establish electrical connection to the internal electrodes. However, because the external electrodes obtained by firing the electroconductive paste is relatively porous, the external electrodes need to be formed with a relatively large thickness to ensure sealing performance that is sufficient to prevent moisture and other contaminants from entering the laminate. Thus, the ordinary electronic component has a problem in that the element size is increased due to the thicknesses of the external electrodes.

On the other hand, in the electronic component 10, the electroconductive layers 12 and 13 are formed to directly cover the exposed portions 26 and 28 for electrical connection to the capacitor conductors 18. Further, the electroconductive layers 14 are formed to directly cover the electroconductive layers 12 and 13. Since the electroconductive layers 12 and 13 are formed by plating, they are made of dense films. Therefore, even with each of the electroconductive layers 14 each being relatively thin, sufficient sealing performance is ensured with the electroconductive layers 12 and 13. Further, since the electroconductive layers 12 and 13 are formed by plating, the electroconductive layers 12 and 13 have relatively small thicknesses. Similarly, the electroconductive layers 15 disposed on the electroconductive layers 14 are formed by plating and have relatively small thicknesses. Thus, in the electronic component 10, the external electrodes 30 can be formed of the electroconductive layers 12 to 15 each being relatively thin. As a result, in the electronic component 10, the element size can be reduced as compared to that of the ordinary electronic component.

Figure 5:
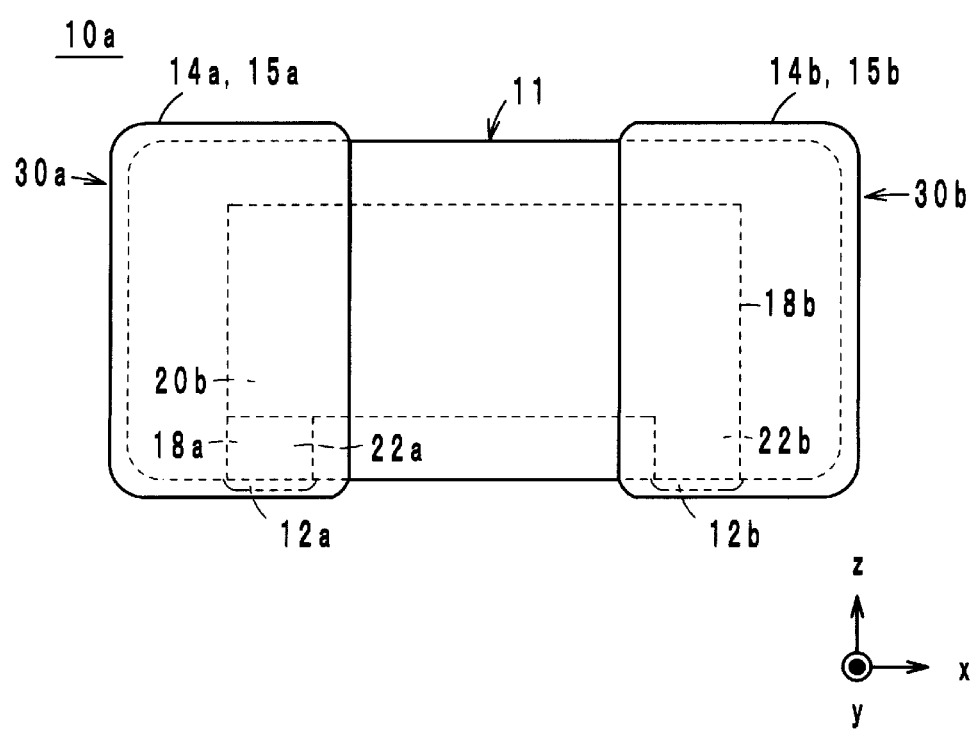
FIG. 5 is a plan view illustrating an electronic component according to a first modification of a preferred embodiment of the present invention while seeing through the electronic component from above in a laminating direction.

An electronic component according to a first modification of a preferred embodiment of the present invention will be described below with reference to the drawing. FIG. 5 is a plan view illustrating an electronic component 10a according to the first modification while seeing through the electronic component 10a from above in a laminating direction.

As illustrated in FIG. 5, the capacitor conductors 18 may preferably not include the lead portions 24a and 24b. With the omission of the lead portions 24a and 24b, the electroconductive layers 13a and 13b are also not required. As a result, the height of the electronic component 10a in the z-axis direction is reduced.

Figure 6:
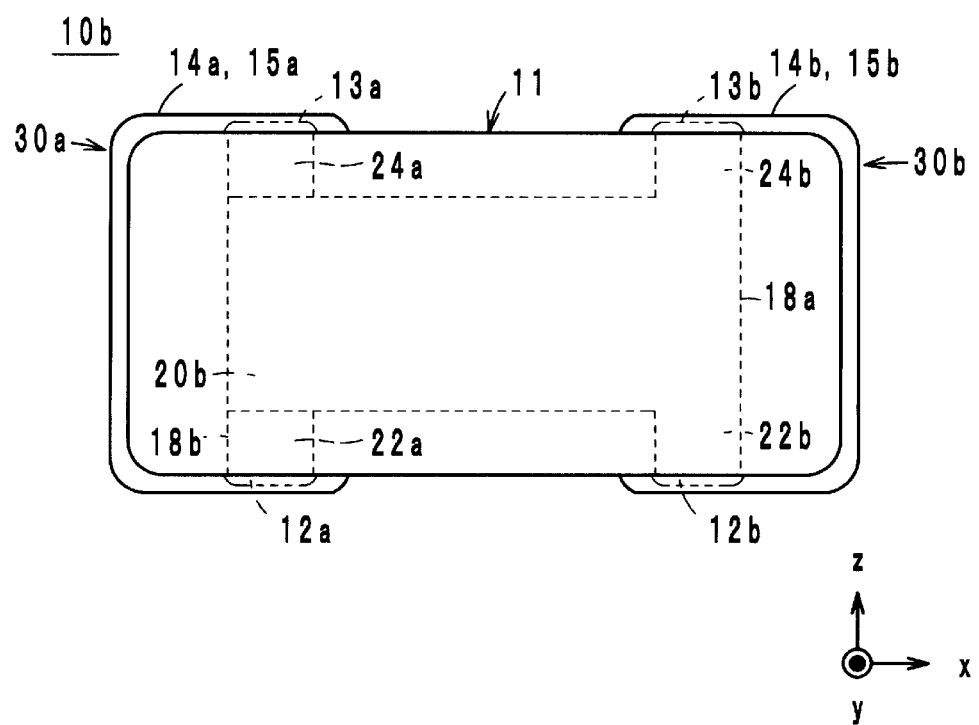
FIG. 6 is a plan view illustrating an electronic component according to a second modification of a preferred embodiment of the present invention while seeing through the electronic component from above in a laminating direction.

An electronic component according to a second modification of a preferred embodiment of the present invention will be described below with reference to the drawing. FIG. 6 is a plan view illustrating an electronic component 10b according to the second modification while seeing through the electronic component 10b from above in a laminating direction.

As illustrated in FIG. 6, the electroconductive layers 14 and 15 are preferably not disposed on the side surfaces S1 and S2, and they have a substantial C-shape when viewed in the y-axis direction. With such an arrangement, the width of the electronic component 10b in the y-axis direction is less than the width of the electronic component 10 in the y-axis direction by an amount corresponding to the thicknesses of the electroconductive layers 14 and 15.

When the electroconductive layers 14 and 15 illustrated in FIG. 6 are formed, only the side surfaces S1 and S2 need to be masked.

Figure 7:
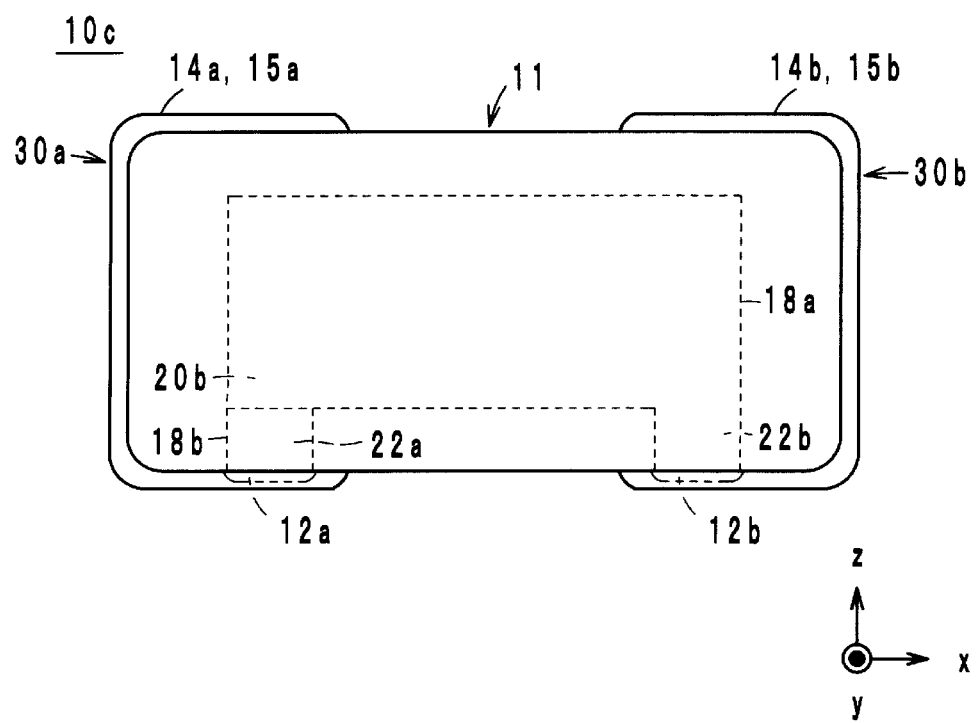
FIG. 7 is a plan view illustrating an electronic component according to a third modification of a preferred embodiment of the present invention while seeing through the electronic component from above in a laminating direction.

An electronic component according to a third modification of a preferred embodiment of the present invention will be described below with reference to the drawing. FIG. 7 is a plan view illustrating an electronic component 10c according to the third modification while seeing through the electronic component 10c from above in a laminating direction.

The electronic component 10c differs from the electronic component 10b in that the capacitor conductors 18 do not include the lead portions 24a and 24b, and that the electroconductive layers 13a and 13b are not provided. As illustrated in FIG. 7, since the capacitor conductors 18 do not include the lead portions 24a and 24b, the electroconductive layers 13a and 13b are also not required. As a result, the height of the electronic component 10c in the z-axis direction is reduced.

When the electroconductive layers 14 and 15 illustrated in FIG. 7 are formed, only the side surfaces S1 and S2 need to be masked.

Figure 8:
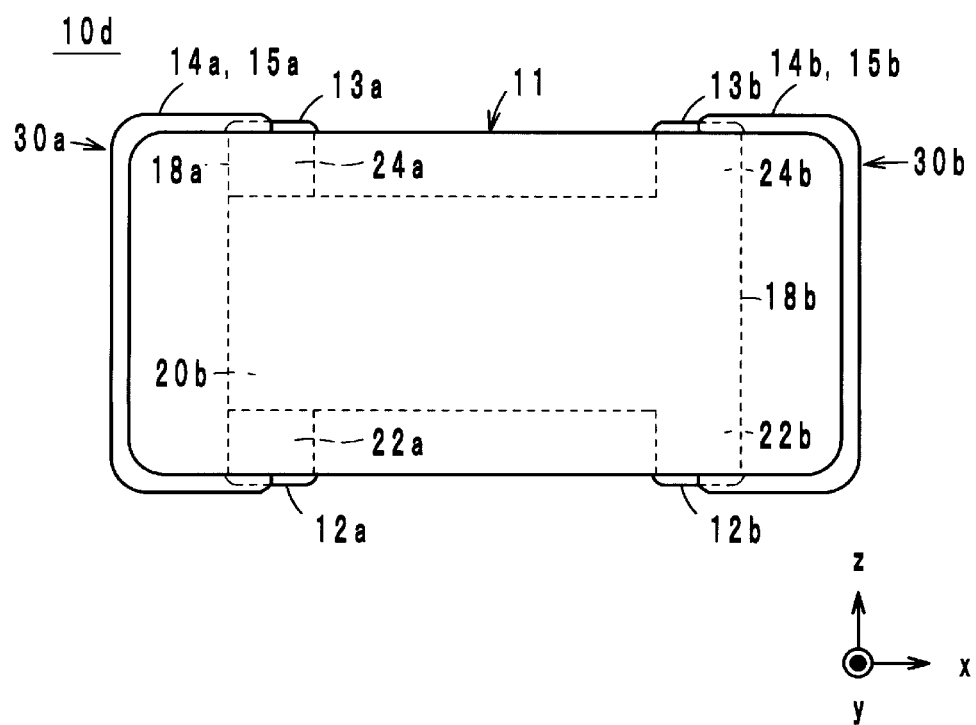
FIG. 8 is a plan view illustrating an electronic component according to a fourth modification of a preferred embodiment of the present invention while seeing through the electronic component from above in a laminating direction.

An electronic component according to a fourth modification of a preferred embodiment of the present invention will be described below with reference to the drawing. FIG. 8 is a plan view illustrating an electronic component 10d according to the fourth modification while seeing through the electronic component 10d from above in a laminating direction.

The electronic component 10d differs from the electronic component 10b in that the electroconductive layers 14 and 15 cover respective portions of the electroconductive layers 12 and 13. Even in the electronic component 10d in which the electroconductive layers 14 and 15 cover respective portions of the electroconductive layers 12 and 13, the electroconductive layers 12 and 13 are also effectively prevented from being peeled off from the laminate 11.

When the electroconductive layers 14 and 15 illustrated in FIG. 8 are formed, only the side surfaces S1 and S2 and the portions of the electroconductive layers 12 and 13 need to be masked.

Figure 9:
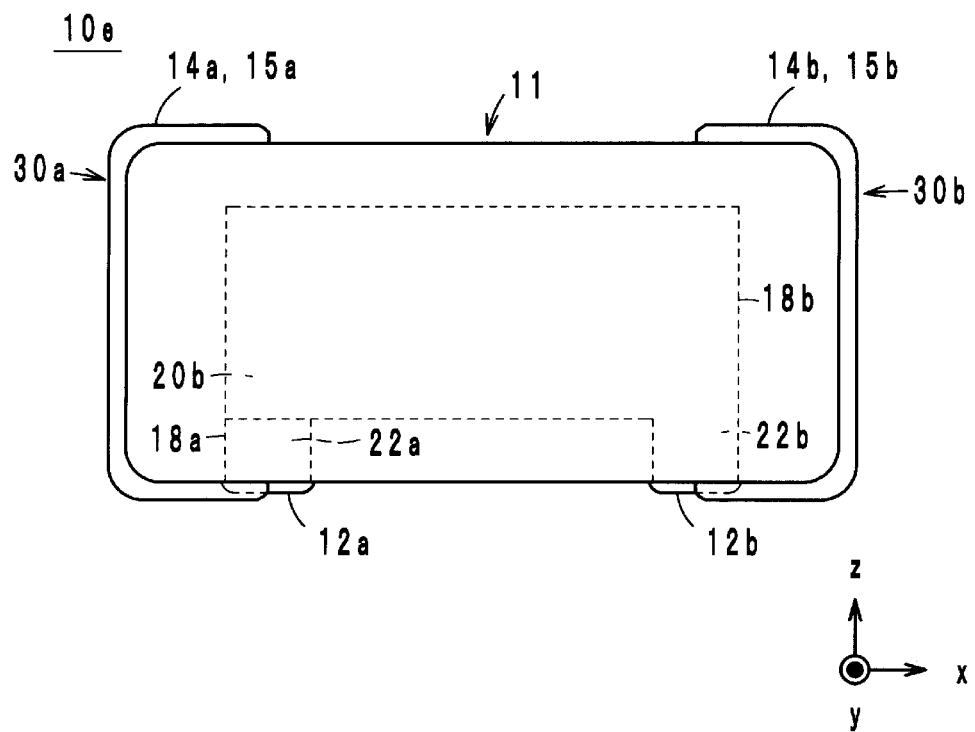
FIG. 9 is a plan view illustrating an electronic component according to a fifth modification of a preferred embodiment of the present invention while seeing through the electronic component from above in a laminating direction.

An electronic component according to a fifth modification of a preferred embodiment of the present invention will be described below with reference to the drawing. FIG. 9 is a plan view illustrating an electronic component 10e according to the fifth modification while seeing through the electronic component 10e from above in a laminating direction.

The electronic component 10e differs from the electronic component 10d in that the capacitor conductors 18 do not include the lead portions 24a and 24b, and that the electroconductive layers 13a and 13b are not provided. As illustrated in FIG. 9, since the capacitor conductors 18 do not include the lead portions 24a and 24b, the electroconductive layers 13a and 13b are also not required. As a result, the height of the electronic component 10e in the z-axis direction is reduced from that of the electronic component 10d in the z-axis direction.

When the electroconductive layers 14 and 15 illustrated in FIG. 9 are formed, only the side surfaces S1 and S2 and the portions of the electroconductive layers 12 and 13 need to be masked.

Figure 10:
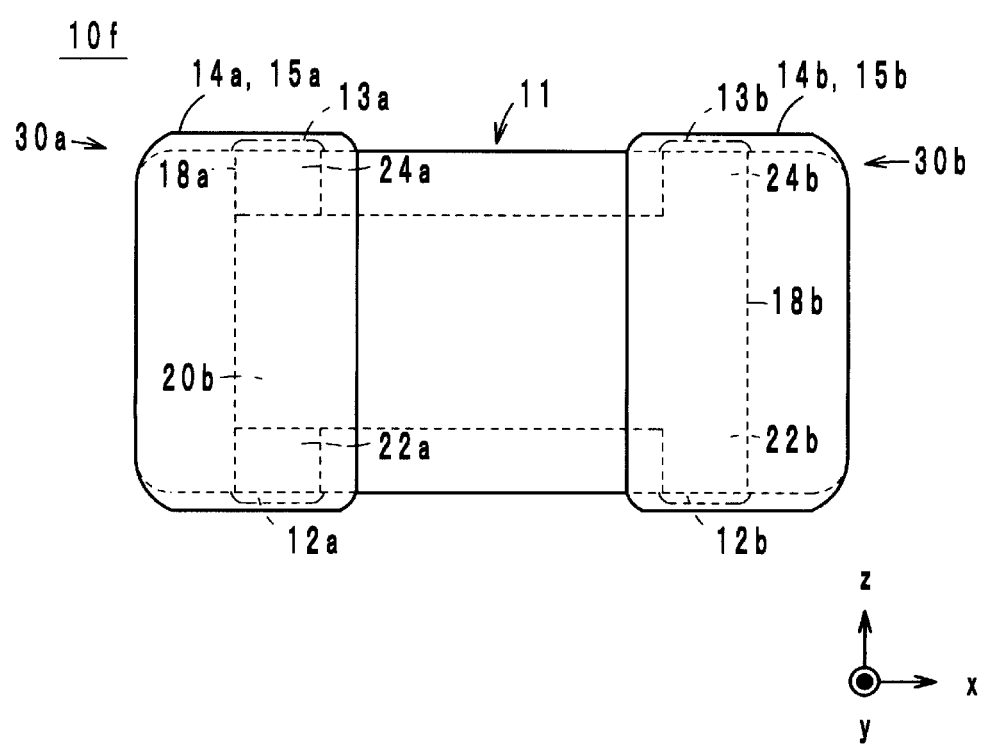
FIG. 10 is a plan view illustrating an electronic component according to a sixth modification of a preferred embodiment of the present invention while seeing through the electronic component from above in a laminating direction.

An electronic component according to a sixth modification of a preferred embodiment of the present invention will be described below with reference to the drawing. FIG. 10 is a plan view illustrating an electronic component 10f according to the sixth modification while seeing through the electronic component 10f from above in a laminating direction.

The electronic component 10f differs from the electronic component 10 in that the electroconductive layers 14 and 15 are not disposed on the end surfaces S3 and S4. As a result, the length of the electronic component 10f in the x-axis direction is reduced as compared to the length of the electronic component 10 in the x-axis direction by an amount corresponding to the thicknesses of the electroconductive layers 14 and 15.

When the electroconductive layers 14 and 15 illustrated in FIG. 10 are formed, only the end surfaces S3 and S4 need to be masked.

Figure 11:
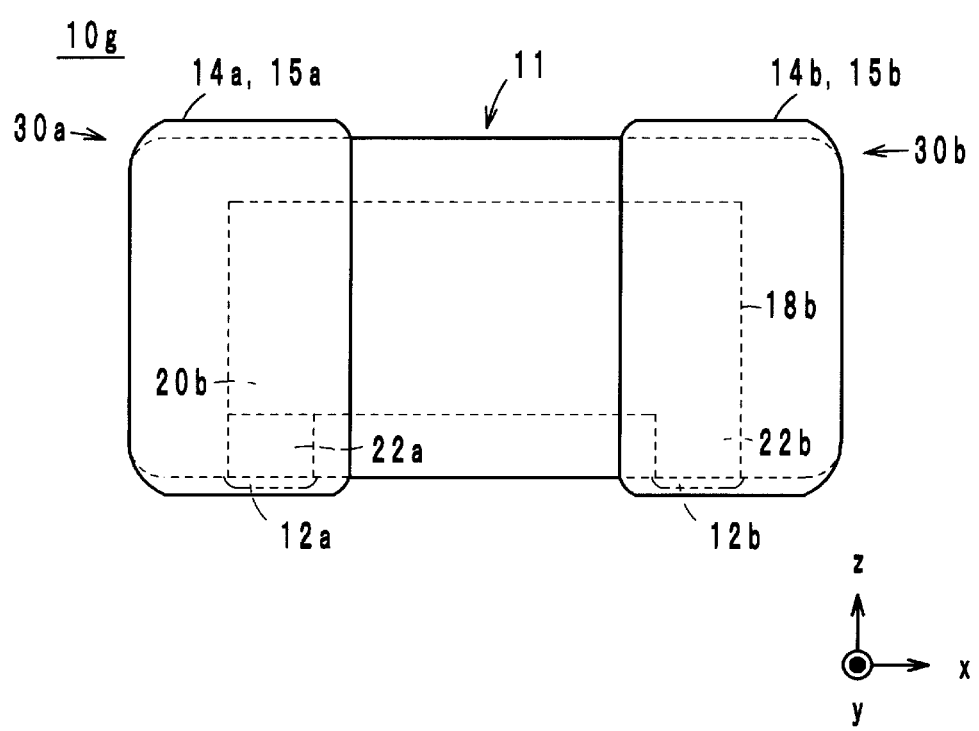
FIG. 11 is a plan view illustrating an electronic component according to a seventh modification of a preferred embodiment of the present invention while seeing through the electronic component from above in a laminating direction.

An electronic component according to a seventh modification of a preferred embodiment of the present invention will be described below with reference to the drawing. FIG. 11 is a plan view illustrating an electronic component 10g according to the seventh modification while seeing through the electronic component 10g from above in a laminating direction.

The electronic component 10g differs from the electronic component 10f in that the capacitor conductors 18 do not include the lead portions 24a and 24b, and in that the electroconductive layers 13a and 13b are not provided. As illustrated in FIG. 11, since the capacitor conductors 18 do not include the lead portions 24a and 24b, the electroconductive layers 13a and 13b are also not required. As a result, the height of the electronic component 10g in the z-axis direction is reduced from the height of the electronic component 10f in the z-axis direction.

When the electroconductive layers 14 and 15 illustrated in FIG. 11 are formed, only the end surfaces S3 and S4 need to be masked.

The electronic component according to the present invention is not limited to the above-described preferred embodiment and modifications, and it can be modified without departing from the scope of the present invention.

While, in each of the electronic components 10 and 10a to 10g, the electroconductive layer 14 is preferably made of the material including metal and glass, it may preferably be made of a material including metal and resin. Stated another way, the electroconductive layer 14 may preferably be made of an electroconductive resin including a metal filler and resin. The metal filler may preferably be made, for example, of one kind of metal selected from a group consisting of Cu, Ni, Ag and Pd, or an alloy including one of those metals. Alternatively, coated powder, such as Cu powder coated with Ag, may preferably be used as the metal filler. The resin may preferably be, for example, a thermosetting resin, such as an epoxy resin or a phenol resin.

When the electroconductive layer 14 is made of the material including metal and resin, the resin is softened during thermal setting, and the softened resin enters concave spots in the surfaces of the electroconductive layers 12 and 13 and concave spots in the surfaces of the laminate 11. As a result, in each of the electronic components 10 and 10a to 10g, the electroconductive layers and 13 can be more effectively prevented from being peeled off from the laminate 11 due to the anchoring effect or the chemical adsorption force of the resin. The thermosetting temperature of the electroconductive layer 14 is preferably in a range of about 200° C. to about 300° C., for example.

Figure 12:
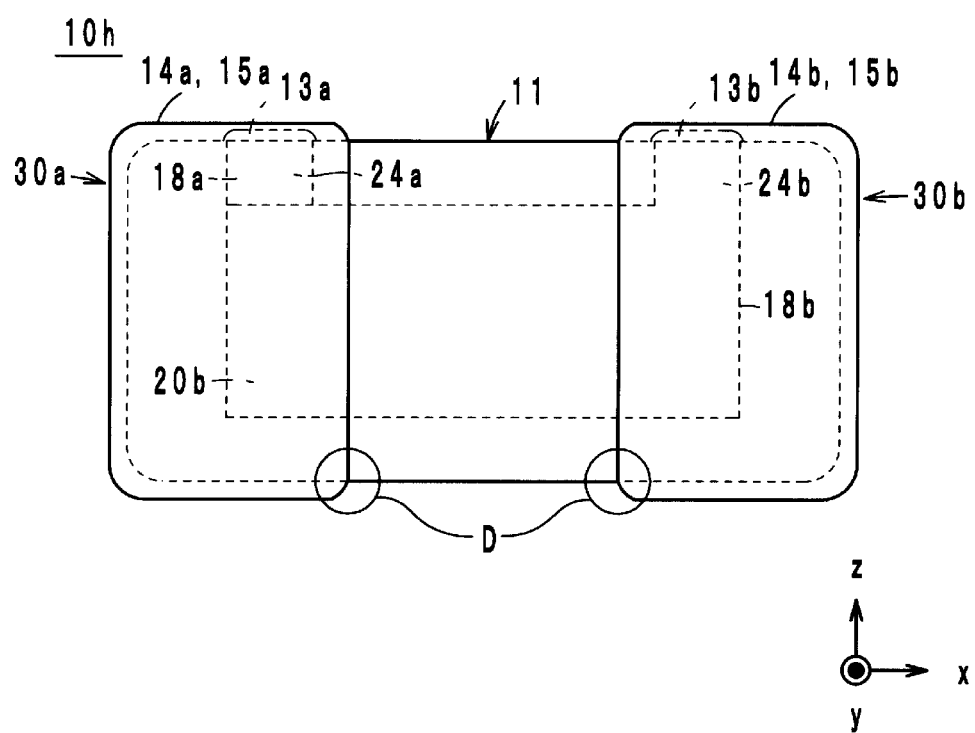
FIG. 12 is a plan view illustrating an electronic component according to another preferred embodiment while seeing through the electronic component from above in a laminating direction.

An electronic component 10h according to another preferred embodiment of the present invention, which preferably includes the electroconductive layers 14 each made of the material including metal and resin, will be described below with reference to the drawing. FIG. 12 is a plan view illustrating the electronic component 10h according to this preferred embodiment while seeing through the electronic component 10h from above in a laminating direction.

As illustrated in FIG. 12, the capacitor conductors 18 may preferably omit the lead portions 22a and 22b. With the omission of the lead portions 22a and 22b, the electroconductive layers 12a and 12b are also not required. As a result, the height of the electronic component 10h in the z-axis direction is reduced.

Further, in the electronic component 10h, cracking attributable to flexing of a circuit board can be effectively prevented as described below. In the ordinary electronic component, because of the relatively hard external electrodes being fixed to the laminate, when the circuit board is mounted or when thermal shock cycles are applied to the circuit board, the circuit board is flexed and stress is exerted on the laminate in the electronic component and on solders for establishing the connection. Consequently, the laminate and the solders may be cracked. Thus, there is a risk that the occurrence of a crack may cause a short-circuit fault or an open-circuit fault.

On the other hand, in the electronic component 10h, since the electroconductive layers 14a and 14b are each made of the material including metal and resin, they are relatively soft. Therefore, when the circuit board is flexed, the electroconductive layers 14a and 14b are peeled off from the laminate 11, respectively, at an end (denoted by D in FIG. 12) of the electroconductive layer 14a on the lower surface S6, which end is located relatively on the positive direction side in the x-axis direction, and at an end (denoted by D in FIG. 12) of the electroconductive layer 14b on the lower surface S6, which end is located relatively on the negative direction side in the x-axis direction. Thus, cracking attributable to the flexing of the circuit board can be effectively avoided in the electronic component 10h. Even when the electroconductive layers 14a and/or 14b is peeled off from the laminate 11 at D in FIG. 12, a current path extending from the electroconductive layer 14 to the capacitor conductors 18 through the electroconductive layer 13 is ensured, whereby an open-circuit fault does not occur in the electronic component 10h.

While, in each of the electronic components 10 and 10a to 10h, the electroconductive layers 12 and 13 are preferably formed by barrel plating that is one type of electroplating, they may also be formed by electroless plating, for example.

While, in each of the electronic components 10 and 10a to 10h, the laminate 11 preferably includes the capacitor C, it may include other electronic elements, such as a coil and a resistance, for example.

As described above, preferred embodiments of the present invention are effectively applied to an electronic component and are especially superior in effectively preventing the external electrodes, which are formed by plating, from being peeled off from the laminate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a laminate including a plurality of laminated insulator layers and a mounting surface defined by outer edges of the plurality of insulator layers, the outer edges being continuously arranged adjacent to each other;
    inner conductors disposed on the plurality of insulator layers and including exposed portions exposed at the mounting surface between the plurality of insulator layers; and
    an external electrode disposed on a surface of the laminate; wherein the external electrode includes:
        a first electroconductive layer disposed on the mounting surface to directly cover the exposed portions and being made of a plated material; and
        a second electroconductive layer covering at least a portion of the first electroconductive layer, covering partial surfaces of the laminate, and made of a material including metal and one of glass and resin.

2. The electronic component according to claim 1, wherein the second electroconductive layer covers the first electroconductive layer entirely or substantially entirely.

3. The electronic component according to claim 1, wherein the laminate has a substantially rectangular parallelepiped shape; and
    the second electroconductive layer extends in a continuously overlapping relation over the mounting surface and other surfaces of the laminate which are adjacent to the mounting surface.

4. The electronic component according to claim 1, wherein the first electroconductive layer is arranged so as not to extend off of the mounting surface.

* * * * *